(12) United States Patent
Graves

(10) Patent No.: US 6,900,726 B2
(45) Date of Patent: May 31, 2005

(54) SYSTEM AND METHOD FOR FIBER OPTIC COMMUNICATION WITH SAFETY-RELATED ALARM SYSTEMS

(75) Inventor: Edwin Graves, Severn, MD (US)

(73) Assignee: Antronnix, Inc., Silver Spring, MD (US)

( * ) Notice: Subject to any disclaimer, the term of this patent is extended or adjusted under 35 U.S.C. 154(b) by 77 days.

(21) Appl. No.: 10/660,960

(22) Filed: Sep. 12, 2003

(65) Prior Publication Data

US 2004/0130445 A1 Jul. 8, 2004

Related U.S. Application Data

(60) Provisional application No. 60/437,951, filed on Jan. 3, 2003.

(51) Int. Cl.[7] ................................. H04Q 1/30
(52) U.S. Cl. ...................... 340/531; 340/506; 340/533; 340/3.1
(58) Field of Search ................................ 340/531, 506, 340/507, 533, 693.6, 3.1

(56) References Cited

U.S. PATENT DOCUMENTS

| | | | |
|---|---|---|---|
| 4,161,650 A | | 7/1979 | Caouette et al. |
| 4,174,149 A | | 11/1979 | Rupp |
| 4,300,133 A | * | 11/1981 | Solomon .................... 340/630 |
| 4,367,460 A | * | 1/1983 | Hodara ....................... 340/550 |
| 4,379,290 A | * | 4/1983 | Muggli et al. .............. 340/629 |
| 4,492,452 A | * | 1/1985 | Suzuki et al. ................. 396/54 |
| 4,533,834 A | | 8/1985 | McCormack |
| 4,573,046 A | * | 2/1986 | Pinnow ...................... 340/5.64 |
| 4,577,184 A | * | 3/1986 | Hodara et al. .............. 340/566 |
| 4,596,049 A | | 6/1986 | Rizzotti, III |
| 4,823,015 A | * | 4/1989 | Galvin et al. ............... 250/564 |
| 4,839,527 A | | 6/1989 | Leitch |
| 4,933,667 A | | 6/1990 | Shaw et al. |
| 5,451,931 A | * | 9/1995 | Muller et al. ............... 340/630 |
| 5,654,746 A | | 8/1997 | McMullan, Jr. et al. |
| 5,724,363 A | | 3/1998 | Breya |
| 5,914,794 A | * | 6/1999 | Fee et al. ..................... 398/20 |
| 5,959,531 A | | 9/1999 | Gallagher, III et al. |
| 5,999,094 A | | 12/1999 | Nilssen |
| 6,215,565 B1 | * | 4/2001 | Davis et al. .................. 398/27 |

OTHER PUBLICATIONS

P. Kopera, Fiber–to–the–Desk: The Ultimate Structured Cabling System. (Anixter, white paper, 1996).

* cited by examiner

*Primary Examiner*—Daryl C. Pope
(74) *Attorney, Agent, or Firm*—Roberts Abokhair & Mardula, LLC

(57) ABSTRACT

A system and method for monitoring and safety related systems (SRSs) in a Secure Compartmented Information Facility (SCIF) that addresses concerns for security of electronic emanations from equipment in the SCIF. A fiber optic link connects an optical receiver located within a SCIF and an optical transmitter located outside the SCIF. Alarm signals generated by an SRS located outside the SCIF are detected and sent to the optical receiver over the fiber optic link. The optical receiver converts the optical signals to electrical signals and directs the signals to alarm devices within the SCIF. Additionally, an audio signal generated at the location outside the SCIF is converted to an optical signal and then reconverted to an audio signal by the optical receiver for broadcast over a speaker located within the SCIF. A tone signal generated at the optical transmitter is continuously sent over the optical fiber link to the optical receiver and the SCIF speaker. The tone signal is monitored and any loss of the tone signal at the speaker causes an alarm signal to be returned to the optical transmitter located outside the SCIF. The optical receiver located within the SCIFF monitors an alarm device within the SCIFF for the presence of an alarm condition within the SCIFF. If an alarm condition within the SCIFF is detected, an alarm signal is sent over the fiber optic link to the optical transmitter located outside the SCIFF and directed to the SRS located outside the SCIFF.

11 Claims, 4 Drawing Sheets

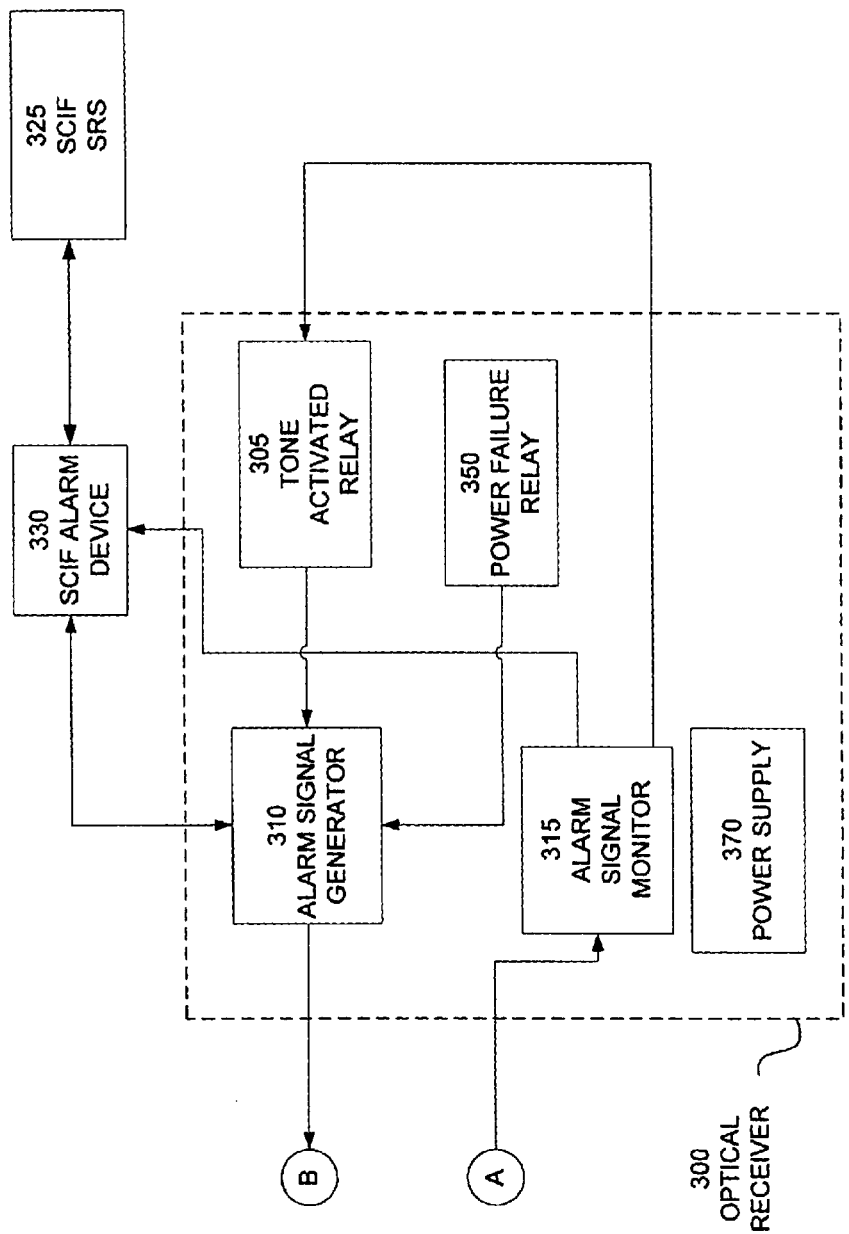

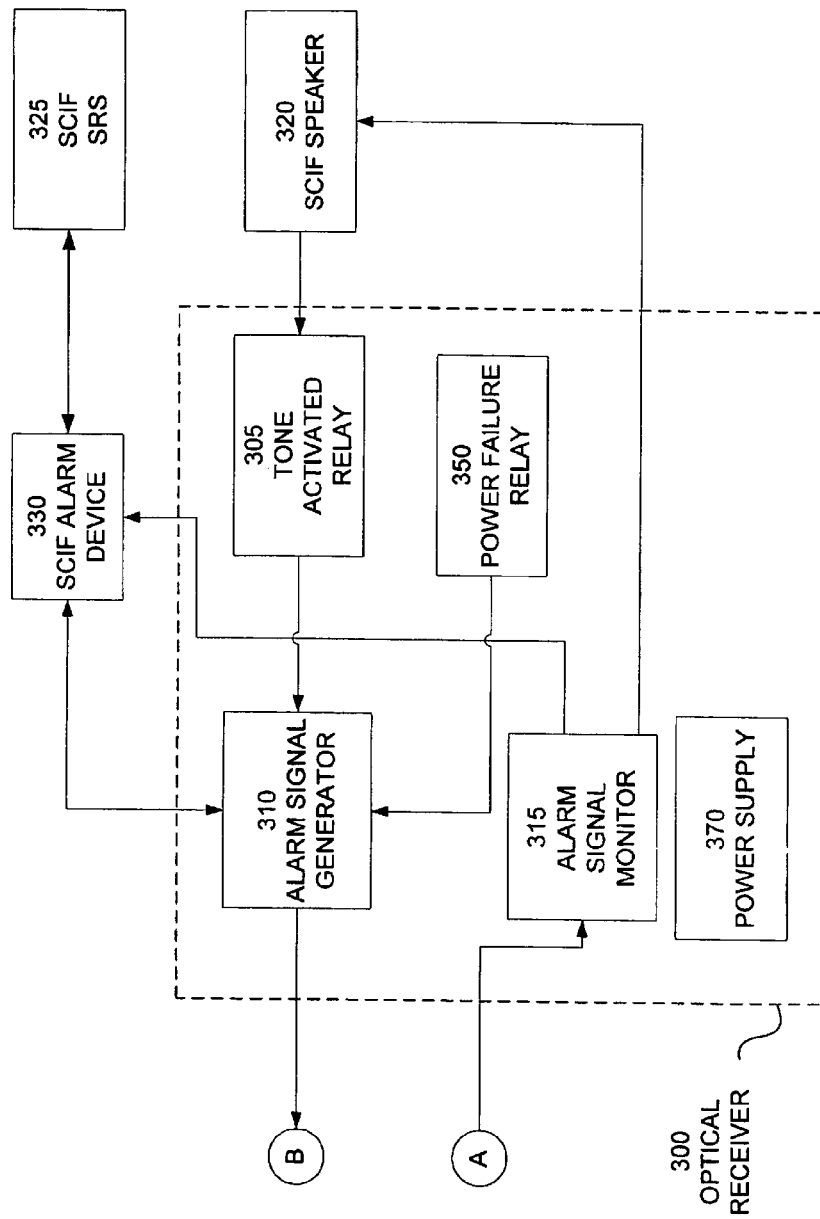

SYSTEM AND METHOD FOR FIBER OPTIC COMMUNICATION WITH SAFETY-RELATED ALARM SYSTEMS

CROSS REFERENCE TO RELATED APPLICATIONS

This application claims priority under 35 U.S.C. § 119(e) from provisional application No. 60/437,951 filed Jan. 3, 2003. The 60/437,951 provisional application is incorporated by reference herein, in its entirety, for all purposes.

FIELD OF THE INVENTION

This invention relates generally for alarm systems. More particularly the present invention is a system and method for monitoring safety related systems (SRSs) in a Secure Compartmented Information Facility (SCIF) that addresses concerns for security of electronic emanations from equipment in the SCIF.

BACKGROUND OF THE INVENTION

Radio frequency (RF)-shielded rooms and SCIF areas are primarily constructed and used by the military and the government to create secure areas where computing and various forms of communications can occur without those areas being susceptible to outsiders intercepting the secret information or communications occurring therein. Computers and other electronic devices create electrical emanations that can be transmitted over power lines, communications lines, and other electronic cables that are resident in a SCIF. As a consequence, communications and computations can be intercepted and interpreted.

RF-shielded rooms are constructed using steel (or copper) walls and electronic filters and re connected to power and communication cables to isolate the electrical emanations created by the computer equipment and communications equipment within the SCIF. Unfortunately, electronic filtering techniques that are used on incoming and outgoing power and communications cables prevent most types of fire alarm circuits and other two-way communication paths from properly functioning within SCIF's.

SCIF areas are also constructed to protect against speech conversations from being intercepted or heard outside the secure area. SCIF areas are also built to protect from speech conversations being "heard" by passive speaker circuits (such as public address systems, fire alarm voice speaker circuits, and intercom systems). These small electrical currents can be intercepted on the system cabling outside the secure area and be amplified to actually "listen in" on the private conversations. Generally, speaker circuits for public address systems, intercom systems, and fire alarm systems are not built to prevent this compromise of voice information. If speakers having countermeasures were in place, they might not meet the requirements for audible alarm systems.

Thus, the regulations that allow a SCIF to be qualified to house classified operations are frequently at odds with meeting building code requirements for providing proper audibility of fire alarm signals in the secure areas of the building.

Fiber optical cabling offers a secure means of communication that is generally immune from electromagnetic interference and eavesdropping. While these qualities of fiber optical cabling have been exploited in the art, the use of such cabling to provide alarms in secure areas has not been addressed.

In U.S. Pat. No. 4,161,650 issued to Caoutte et al., fiber optical cable is used to convert the output of a parallel electrical interface to optical digital signals, and to convert the optical digital signals back to parallel electrical signals at the receiving end. The fiber optical cable was identified as reducing cross-talk over copper circuits.

In U.S. Pat. No. 4,596,049 issued to Rizzotti, digital control signals are sent over fiber optical cable between a plurality of remote stations and a local control station. The local control station monitors a device to be controlled and reports on its status to the remote stations. The fiber optical cable was identified as reducing EMI, particularly in control circuits used on ships.

In U.S. Pat. No. 5,724,363 issued to Breya, a system and method for reducing system errors in an amplitude modulated optical signal transmission system is described. The invention is directed to calibrating a selected analog optical channel while transmitting on another analog optical channel.

In U.S. Pat. No. 4,839,527 issued to Leitch, a fire detection system uses fiber optics to detect communicate the presence of smoke, and to analyze the chemical composition of the smoke.

In U.S. Pat. No. 4,933,667 issued to Shaw et al., a graphic annunciator is described. In a preferred embodiment, the annunciator includes a plurality of light-emitting diodes arranged in a graphic representation of the protected area and a signal processor coupled with the light-emitting diodes for receiving and processing the data signals and for selectively actuating the light-emitting diodes in response thereto according to configuration data stored in memory. The data signals are preferably optical signals transmitted over a fiber optical cable.

In U.S. Pat. No. 5,999,094 issued to Nilssen, a multiconductor telephone and smoke alarm distribution system is described. In an embodiment at least some of the conductors are fiber optical cables with the state desire of attaining a high degree of electromagnetic separation.

In U.S. Pat. No. 4,533,834 issued to McCormack, a fire detection system using optical fibers to transmit flame signals from a plurality of remote monitoring stations to a central detection and analysis station is described. Light from the fibers being dispersed by a prism associated with the scanner to allow detection of the various spectral components of the dispersed light by light sensitive semiconductors. The detected spectral components are then compared to known fire signal signatures which include flicker rate and spectral content information.

In U.S. Pat. No. 4,174,149 issued to Rupp, a secure communications system is disclosed which utilizes an optical signal transmitted over a frangible optical fiber. An alarm signal is continuously transmitted from the information receiver site to the information transmitter site over the same optical fiber. Any attempt to penetrate the optical fiber for the purpose of intercepting the information transmitted therein causes the frangible fiber to shatter, thereby disrupting the alarm signal being received at the information transmitter site. The detection of this condition results in the immediate disabling of the information transmitter What would be useful would be a system and method for securely communicating an alarm condition in a safety related system (SRS) occurring outside of a SCIF to the occupants of the SCIF and for securely communicating an alarm condition occurring in a SRS inside a SCIF to a location outside the SCIF. Such a system and method should provide for detection of the failure of an SRS within the SCIF.

SUMMARY OF THE INVENTION

An embodiment of the present invention is a system and method for securely communicating an alarm condition in an SRS occurring outside of a SCIF to the occupants of the SCIF and for securely communicating an alarm condition in an SRS occurring inside a SCIF to a location outside the SCIF.

It is therefore an aspect of the present invention to provide for the extension of circuits of various types into a SCIF.

It is yet another aspect of the present invention to provide for public address systems and alarms in SRSs to be extended into a SCIF without the potential for transmitting secure communications outside the SCIF.

It is still another aspect of the present invention to provide a fiber optic communication system to eliminate the radiating, or transmitting of secure information outside of a SCIF.

It is a further aspect of the present invention to communicate an alarm condition in an SRS occurring within the SCIF to a location outside the SCIF in a secure fashion.

It is yet another aspect of the present invention to provide means for detecting the failure of SRSs within the SCIF at a location outside the SCIF and the failure of the link between the SCIF and a monitoring station outside the SCIF.

These and other aspects of the present invention will become apparent to those skilled in the art from a review of the technical description contained herein.

An embodiment of the present invention is a system and method for securely communicating an alarm condition in an SRS occurring outside of a SCIF to the occupants of the SCIF and for securely communicating an alarm condition in an SRS occurring inside a SCIF to a location outside the SCIF. By way of illustration and not as a limitation, an SRS comprises a fire detection system, a fire suppression warning system, a security breach system, a biohazard warning system, and an emergency medical warning system. As will be apparent to those skilled in the art, the present invention may be implemented with other warning systems without departing from the scope of the present invention.

In one embodiment of the present invention, an optical transmitter and an optical receiver are in communication over a fiber optic cable. The optical transmitter is installed outside of the SCIF and is connected to the host alarm system (i.e. the building alarm system). For purposes of this application, the host alarm system comprises without limitation fire alarms, smoke alarms, burglar alarms, and other SRSs common in the trade. Further, such systems may also comprise a visual circuitry such as closed-circuit video cameras and the like.

The optical receiver is installed inside the SCIF and is connected to interior speakers and strobe lights inside the SCIF. The optical receiver detects alarm conditions in SRSs within the SCIF.

The optical transmitter and the optical receiver each comprise fiber optic transceivers, power supplies, and audio conversion circuitry. In one embodiment of the present invention, the optical transmitter and the optical receiver operate on 24 Volts DC and each comprises a built in power supply and battery charger for providing battery back up.

In another embodiment of the present invention, the optical transmitter is connected to the building alarm speaker and converts any audio signal from that alarm system to an optical signal that is transmitted over a fiber optic media to the receiver (located inside the SCIF). The optical audio signal is then converted back to a line level audio signal for subsequent play over interior speakers inside the SCIF.

The transmitter also comprises a tone generator module that produces a tone signal. In an embodiment of the present invention, the tone signal is an audio signal of 100 Hz, but present invention is not so limited. The tone signal is combined with a line level audio signal derived from the building alarm speaker or other source. This combined signal is transmitted via the fiber optic cable to the fiber optic receiver inside the SCIF. The tone signal is used to activate a tone-actuated relay in the SCIF. If the tone signal is interrupted for any reason, the tone activated relay sends a trouble signal to an alarm signal generator. For example, and not as a limitation, if the fiber optic cable is link fails, a trouble signal is sent to the alarm signal generator. The alarm signal generator actuates SCIF alarm device to alert the occupants of the SCIF that a problem has occurred. If the tone signal is interrupted and the fiber optic cable link is intact, the trouble signal is also reported to the optical transmitter located outside the SCIF. In an alternate embodiment, the tone signal is delivered to a speaker system within the SCIF and the tone activated relay is in series with the speaker system input. In this embodiment, a failure of the speaker on the input side would also result in the issuance of a trouble signal.

The optical transmitter also comprises an alarm monitor that receives and converts alarm signals from the optical receiver. For example, and not as a limitation, the optical receiver sends an alarm signal if it detects that the fiber optical link or the SCIF speaker is not functioning properly. The optical receiver also sends an alarm signal if the SRS within the SCIF detects an alarm condition within the SCIF. In one embodiment, the alarm monitor comprises contact pairs that are closed when an alarm signal is received. However, this is not meant as a limitation. As those skilled in the art will recognize, other means for receiving and converting the alarm signals may be used without departing from the scope of the present invention.

The optical transmitter also comprises the ability to monitor a building alarm device from a SRS and transmit a signal to the optical receiver. This allows an alarm system inside the SCIF to be activated when an alarm condition exists outside the SCIF.

The optical receiver, located inside the SCIF, receives audio signals over a fiber optic link from the transmitter. The receiver then converts the optical signals to the electrical signals for subsequent use. In one embodiment of the present invention, a line level audio signal is distributed to a speaker within the SCIF to provide an audible signal to those inside the SCIF. In one embodiment of the present invention, the audible signal may be an alarm signal. In yet another embodiment of the present invention, the audible signal may be a voice message.

The audio circuit in the SCIF is monitored through the optical receiver by a tone-activated relay for the presence of a tone signal. Loss of the tone signal (caused by a break in the fiber optic cable, the speaker wiring or other malfunction) causes the tone-activated relay to send a trouble signal to an alarm signal generator. The alarm signal generator creates an optical signal that is transmitted over the optical media to the alarm monitor within the optical transmitter. In an embodiment of the present invention, the alarm monitor closes normally opened contacts resulting in an alarm signal being generated. This alarm signal is used to report the alarm condition to the building alarm system.

BRIEF DESCRIPTION OF THE DRAWINGS

FIG. 3 illustrates an optical receiver as used in the system illustrated in FIG. 1 according to an embodiment of the present invention.

FIG. 4 illustrates an alternative embodiment of the optical receiver as used in the system illustrated in FIG. 1.

DETAILED DESCRIPTION OF THE INVENTION

As noted above, the present invention is a system and method for providing alarm monitoring and notification in a SCIF. Signal emanation from the SCIF is avoided by converting electrical signals to optical signals as they are generated in the SCIF.

Figure 1:
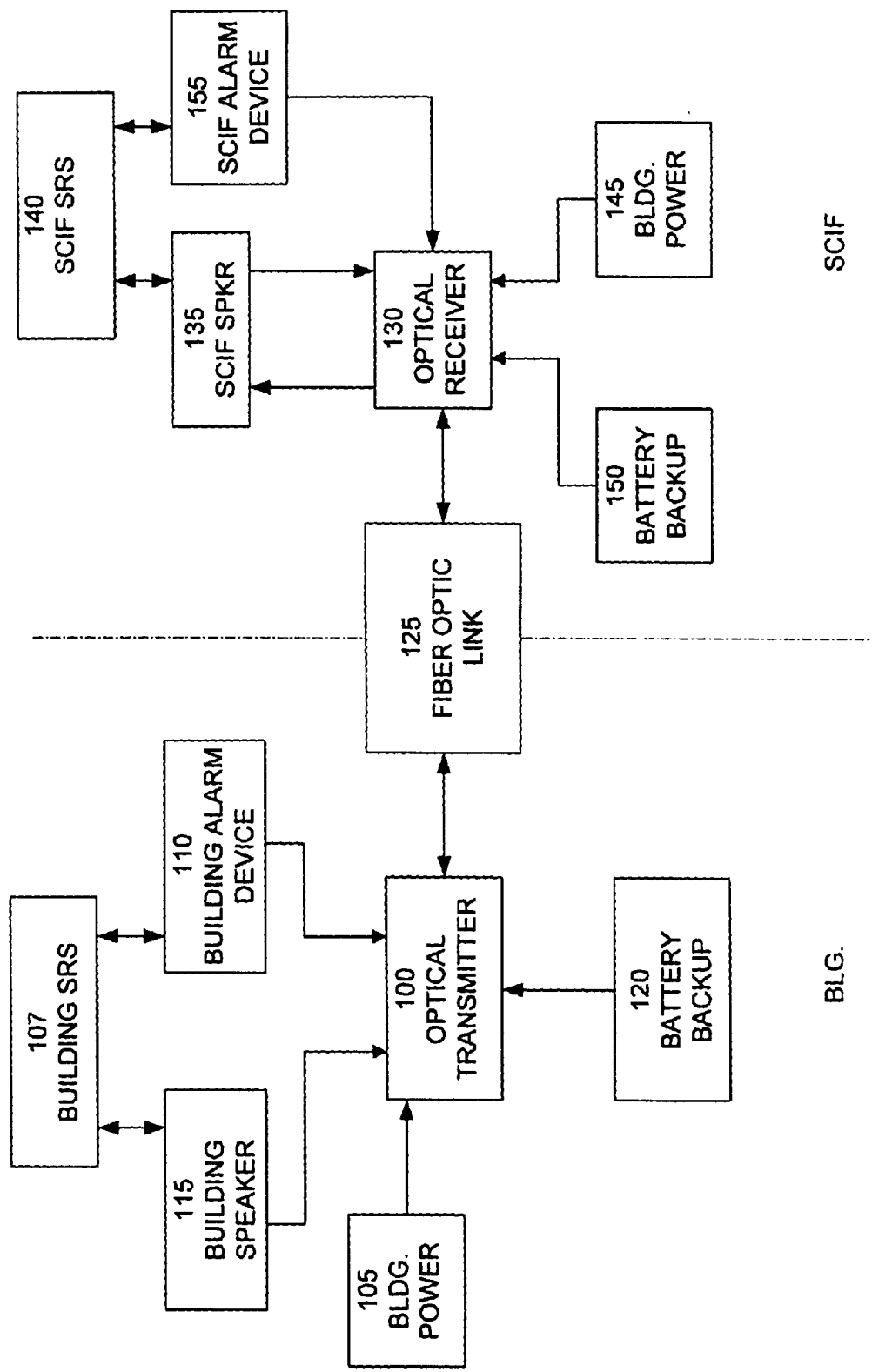
FIG. 1 illustrates an overview of a system for securely communicating an alarm condition in an SRS occurring outside of a SCIF to the occupants of the SCIF and for securely communicating an alarm condition in an SRS occurring inside a SCIF to a location outside the SCIF according to an embodiment of the present invention.

Referring to FIG. 1, a system for securely communicating an alarm condition in an SRS occurring outside of a SCIF to the occupants of the SCIF and for securely communicating an alarm condition in an SRS occurring inside a SCIF to a location outside the SCIF according to an embodiment of the present invention is illustrated. The fiber optic system comprises an optical transmitter 100 connected over an optical fiber link 125 to an optical receiver 130 inside the SCIF.

The optical transmitter 100 is connected to a building alarm device 110, which receives a signal from a SRS 107. By way of illustration and not as a limitation, an SRS 107 comprises a fire and smoke alarm system and a building alarm device 110 comprises a strobe and a speaker. While FIG. 1 depicts a single building alarm device 110 and a single SRS 107, the present invention is not so limited. Any number of building alarm devices and SRSs may be used up to the capacity of optical transmitter 100.

Any signal from the building alarm device 110 is transmitted to the optical transmitter 100 that converts the electrical signal received to an optical signal. That optical signal is sent over the fiber optic link 125 to the optical receiver 130.

As noted above, when an alarm condition in the building exists, an electrical signal is converted to an optical signal by the optical transmitter 100 and sent over optical link 125 to the optical receiver 130. The optical receiver 130 coverts the optical signal to an electrical signal that is used to power a SCIF speaker 135 and/or a SCIF alarm device 155. This allows personnel within the SCIF to be alerted to condition outside of the SCIF.

In yet another embodiment, when SCIF SRS 140 determines that an alarm condition exists within the SCIF, an alarm signal is sent to SCIF speaker 135 and/or SCIF alarm device 155. The alarm condition is detected by optical receiver 130 and is reported over fiber optic link 125 to optical transmitter 100 where it is sent to the building alarm system (see, FIG. 2).

In still another embodiment, a tone signal is generated by optical transmitter 100 is sent to optical receiver 130. Optical receiver 130 monitors for the presence of the tone signal. If the tone signal is not present, an alarm signal is sent to the optical transmitter 100 and forwarded on to the building alarm system (see, FIG. 2).

In an embodiment of the present invention, the optical receiver 130 inside the SCIF is also powered by 24 VDC from the building power and also comprises a battery back up 150 that provides 24 VDC during times of power failure. In another embodiment, SCIF speaker 135 is a self-powered speaker. However, this is not meant as a limitation.

Figure 2:
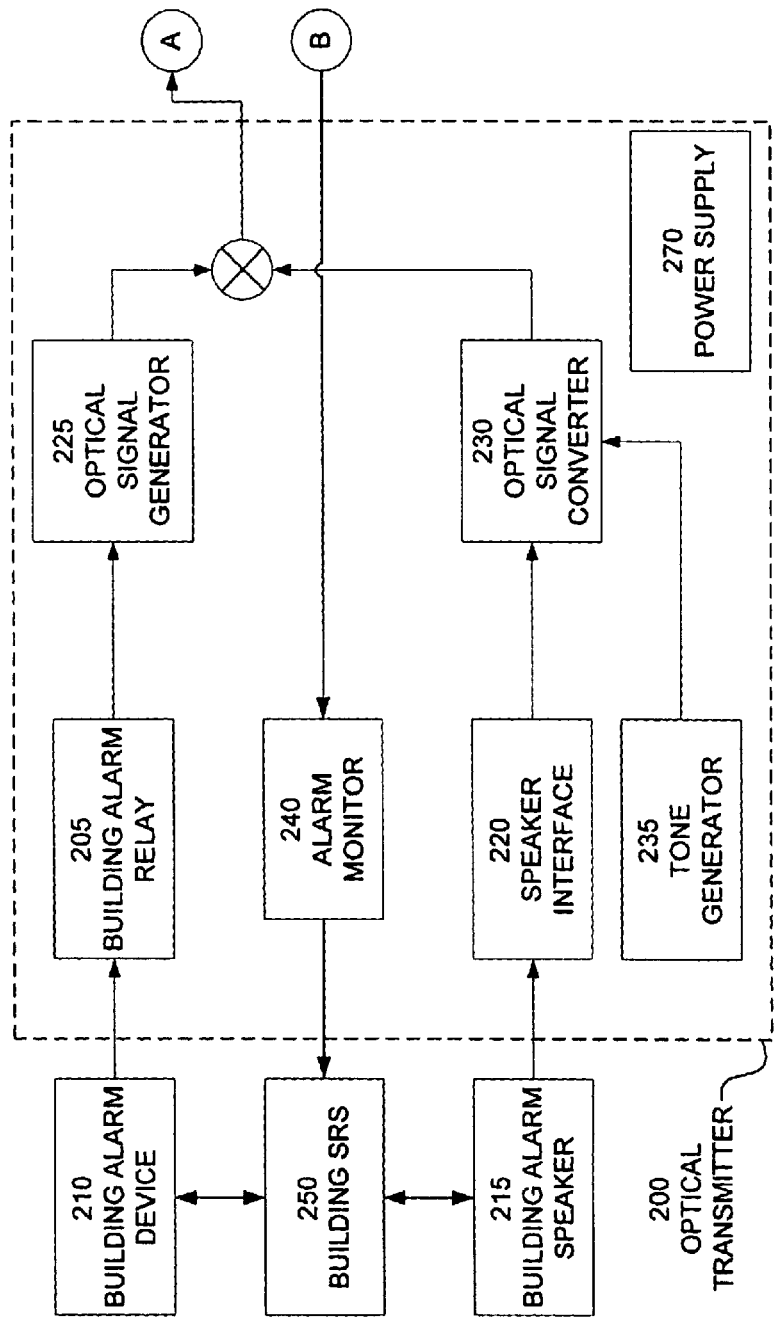
FIG. 2 illustrate an optical transmitter as used in the system illustrated in FIG. 1 according to an embodiment of the present invention.

FIG. 2 illustrates an optical transmitter according to an embodiment of the present invention. The optical transmitter 200 receives information concerning a building alarm device 210 through the building alarm relay 205. When an alarm conditions is present, the building alarm relay 205 is activated and an alarm signal is sent to an optical signal generator 225. Optical signal generator 225 converts the alarm signal to a fiber optic signal for transmission to the optical receiver in the SCIF.

Speaker interface 220 interfaces between the building alarm speaker 215 and the optical transmitter 200. Speaker interface 220 converts any present speaker signal to a low level audio signal for subsequent conversion to fiber optic signals. The low level audio signal is converted to an analog optical signal by optical signal converter 230.

Tone generator 235 generates a tone signal that is used to assess the integrity of the fiber optic link 125 connecting the optical transmitter 200 and optical receiver 300 (see, FIG. 3) and optionally the speaker circuit integrity within the SCIF (as more fully set forth below). In an embodiment, the tone signal is a 100 Hz signal, but this is not meant as a limitation. The tone signal is combined with the low level audio signal obtained from the speaker interface 220 and converted to an optical signal at optical signal converter 230. The combined optical signal is sent via the fiber optic link 125 (see FIG. 1) to the optical receiver 300 (see FIG. 3) in the SCIF.

Alarm signals from the optical receiver are received by an alarm monitor 240, converted from optical signals to electrical signals, and delivered to building SRS 250 for processing.

Optical transmitter 200 receives power from power supply 270. In an embodiment of the present invention, power supply 270 is an Altronnix AL400ULXB 24 VDC power supply, building alarm relay 205 is an Air Products PAM-1 relay, speaker interface 220 is a Radio Design Labs TX-70A speaker interface, and tone generator 235 is a Radio Design Labs T-OSC-2 oscillator. However, the present invention is not so limited. Other devices performing similar functions may be used without departing from the scope of the present invention. While FIG. 2 depicts a single building alarm device 210 and a single building SRS 250, the present invention is not so limited. Any number of building alarm devices and building SRSs may be used up to the capacity of optical transmitter 200.

The only connection between the fiber transmitter and the receiver is via a single or dual fiber optic link 125 (see FIG. 1). Such cables are known to those skilled in the art.

FIG. 3 illustrates an optical receiver according to an embodiment of the present invention. Incoming fiber optic signals are received at the optical receiver 300 and routed to an alarm signal monitor 315. The combined audio signal (if any) and the tone signal is converted to a line level signal and routed to tone-activate relay 305. The tone-activated relay 305 senses the tone signal generated by the tone generator 235 of the optical transmitter 200 (see FIG. 2). The tone-activated relay 305 remains closed so long as the tone signal is detected. If the tone signal is no longer detected, the tone-activated relay 305 sends a trouble signal to alarm signal generator 310. An alarm signal is then sent SCIF alarm device 330 and to alarm monitor 240 over fiber optic link 125 (if operational) and then to the building SRS 250 (see FIG. 2). In this way, a problem in the optical transmitter 200, the optical receiver 300, or the fiber optic link 125 may be detected and alarms sounded in both the SCIF and the location outside the SCIF.

Referring to FIG. 4, an alternative embodiment of the present invention is illustrated. In this embodiment, the combined audio signal (if any) and the tone signal is converted to a line level signal and routed to a SCIF speaker 320. The tone-activated relay 305 is connected to a "return" speaker circuit. In this embodiment, a loss of the tone signal further suggests that a problem may have occurred in the SCIF speaker 320 or its associated wiring.

Alarm signal monitor 315 also processes alarm signals received from the optical signal generator 225 of optical transmitter 200 (see FIG. 2). These signals are routed to a SCIF alarm device 330. By way of illustration and not as a limitation, the alarm signal is from an intrusion or fire detection system and the SCIF alarm device 330 is a strobe light and/or fire alarm speaker. In this way, an alarm condition in a SRS outside the SCIF can be reported to occupants of the SCIF over a secure optical fiber link.

A SCIF SRS 325 monitors the SCIF for an alarm condition within the SCIF. If an alarm condition is present, the SCIF SRS causes the SCIF alarm device 330 to be activated. The optical receiver determines when SCIF alarm device 330 is activated and causes alarm signal generator 310 to send an alarm signal to optical transmitter 200 (see FIG. 1). In this way, alarm conditions within the SCIF are reported to a location outside the SCIF by secure means.

A power failure relay 350 is also present in the optical receiver. In the event of power failure in the SCIF, the power failure relay 350 causes alarm signal generator 310 to send alarm signal over fiber optic link 125 to the alarm monitor 240 and then to the building SRS 250 (see FIG. 2).

Optical receiver 300 receives power from power supply 370. In an embodiment of the present invention, power supply 370 is an Altronnix AL400ULXB 24 VDC power supply, tone activated relay 205 is Radio Design Labs ST-VOX1 Voice Activated Relay, SCIF speaker 320 is a Wheelock SA-series self amplified speaker, and tone generator 235 is a Radio Design Labs T-OSC-2 oscillator. However, the present invention is not so limited. Other devices performing similar functions may be used without departing from the scope of the present invention.

While FIG. 3 depicts a single SCIF alarm device 330 and a single SCIF SRS 325, the present invention is not so limited. Any number of SCIF alarm devices and SCIF SRSs may be used up to the capacity of optical receiver 300.

By using a fiber optic system to connect external systems with in-SCIF systems, electromagnetic emanations from within the SCIF are minimized. Thus the present invention allows for normal alarm monitoring within the SCIF and alarm notification from outside the SCIF without compromising any classified work taking place within. It will be apparent to those skilled in the art that other variations of the present invention are possible without departing from the scope of the invention as disclosed.

What is claimed is:

1. A system for communicating an alarm condition between a secure compartmented information facility (SCIF) and a location outside the SCIF, the system comprising:
   an optical transmitter located in the outside location;
   an optical receiver located in the SCIF; and an
   fiber optic link connecting the optical transmitter and optical receiver, wherein:
   the optical transmitter is adapted to send a continuous tone to the optical receiver; and
   the optical receiver is adapted to detect the presence of the optical tone and to generate a trouble signal in the event the tone signal is not received.

2. The system for communicating an alarm condition between a SCIF and a location outside the SCIF as in claim 1, wherein the trouble signal is sent to the outside location.

3. The system for communicating an alarm condition between a SCIF and a location outside the SCIF as in claim 1, the system further comprising:
   an inside safety-related system (SRS) located in the SCIF, wherein the inside SRS is adapted to generate an inside alarm condition signal in response to an event occurring in the SCIF;
   an inside alarm signal generator located in the SCIF adapted to convert the inside alarm condition signal to an inside alarm optical signal; and
   an outside alarm signal monitor located in the location outside the SCIF adapted to detect the presence of the inside alarm optical signal and to initiate a response in the event an inside alarm optical signal is present.

4. The system for communicating an alarm condition between a SCIF and a location outside the SCIF as in claim 3, wherein the inside SRS is selected from the group consisting of a fire detection system, a smoke detection system, an intrusion detection system, a biohazard release detection system, a fire suppressant release system, and a chemical release detection system.

5. The system for communicating an alarm condition between a SCIF and a location outside the SCIF as in claim 3 further comprising:
   an outside SRS, wherein the outside SRS is adapted to generate an outside alarm condition signal in response to an event occurring in the location outside the SCIF; and
   an outside alarm signal generator located outside the SCIF adapted to convert the outside alarm condition signal to an outside alarm optical signal; and
   an inside alarm signal monitor located inside the SCIF adapted to detect the presence of the outside alarm optical signal and to initiate a response in the event an outside alarm optical signal is present.

6. The system for communicating an alarm condition between a SCIF and a location outside the SCIF as in claim 5, wherein the outside SRS is selected from the group consisting of a fire detection system, a smoke detection system, an intrusion detection system, a biohazard release detection system, a fire suppressant release system, and a chemical release detection system.

7. The system for communicating an alarm condition between a SCIF and a location outside the SCIF as in claim 5 wherein the outside alarm condition signal is an audio signal delivered to an outside speaker, and wherein the outside alarm signal monitor response in the event that an outside alarm optical signal is present comprises converting the outside alarm optical signal to an audio signal and sending the audio signal to the SCIF speaker.

8. A method for communicating an alarm condition between a secure compartmented information facility (SCIF) and a location outside the SCIF, the method comprising:
   sending a tone signal from an optical transmitter located in the outside location connected via a fiber optic link to an optical receiver located in the SCIF; and
   monitoring the reception of the tone signal by the optical receiver;
   making a determination that the optical receiver is not receiving the tone signal; and in the event the optical receiver is not receiving the tone signal, generating a trouble signal.

9. The method for communicating an alarm condition between a SCIF and a location outside the SCIF as in claim 8, the method further comprising:

generating an inside alarm condition signal in response to an event occurring in the SCIF;

converting the inside alarm condition signal to an inside alarm optical signal;

determining the presence of the inside alarm optical signal at the location outside the SCIF; and initiating a response in the event that an inside alarm optical signal is present.

10. The method for communicating an alarm condition between a SCIF and a location outside the SCIF as in claim 9 further comprising:

generating an outside alarm condition signal in response to an event occurring in the location outside the SCIF;

converting the outside alarm signal to an outside alarm optical signal;

determining the presence of the outside alarm optical signal within the SCIF; and initiating a response in the event that an outside alarm optical signal is present.

11. The method for communicating an alarm condition between a SCIF and a location outside the SCIF as in claim 10, wherein the outside alarm condition signal is an audio signal delivered to an outside speaker, and wherein initiating a response in the event that an outside alarm optical signal is present comprises converting the outside alarm optical signal to an audio signal and sending the audio signal to SCIF speaker.

* * * * *